(12) United States Patent
Tanno

(10) Patent No.: US 7,854,244 B2
(45) Date of Patent: Dec. 21, 2010

(54) LOW NOISE PNEUMATIC TIRE

(75) Inventor: Atsushi Tanno, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 643 days.

(21) Appl. No.: 11/795,280

(22) PCT Filed: Feb. 21, 2006

(86) PCT No.: PCT/JP2006/303013

§ 371 (c)(1),
(2), (4) Date: Jul. 13, 2007

(87) PCT Pub. No.: WO2006/088195

PCT Pub. Date: Aug. 24, 2006

(65) Prior Publication Data

US 2008/0099116 A1    May 1, 2008

(30) Foreign Application Priority Data

Feb. 21, 2005    (JP) .............................. 2005-044437

(51) Int. Cl.
*B60C 5/00* (2006.01)
*B60C 19/00* (2006.01)

(52) U.S. Cl. .................... 152/155; 152/157; 152/158

(58) Field of Classification Search .................. 152/152, 152/154.1, 155, 157, 158
See application file for complete search history.

(56) References Cited

FOREIGN PATENT DOCUMENTS

| JP | 62-216803 | | 9/1987 |
|---|---|---|---|
| JP | 8-132816 | | 5/1996 |
| JP | 2003-252003 | | 9/2003 |
| JP | 2004-291855 | | 10/2004 |
| WO | WO 2005/012005 | | 2/2005 |
| WO | WO 2005/012008 | * | 2/2005 |

* cited by examiner

*Primary Examiner*—Justin Fischer
(74) *Attorney, Agent, or Firm*—Greer, Burns & Crain, Ltd.

(57) ABSTRACT

Disclosed is a pneumatic tire including a single or a plurality of noise absorbing members formed of a porous material attached to one side of surfaces of an elastic band in the longitudinal direction thereof, and also disposed on the tire inner peripheral surface by using the elastic band along the circumferential direction. Further, the tire includes a plurality of width-direction reinforcing members disposed with intervals in the tire circumferential direction on surfaces, facing the elastic band, of the corresponding noise absorbing members and also extending from the elastic band to both ends of the corresponding noise absorbing members in the width direction thereof.

13 Claims, 3 Drawing Sheets

US 7,854,244 B2

LOW NOISE PNEUMATIC TIRE

TECHNICAL FIELD

The present invention relates to a low noise pneumatic tire. Specifically, the present invention relates to a low noise pneumatic tire in which the damage of noise absorbing members disposed on the tire inner peripheral surface is suppressed to the minimum even when the tire runs over a nail.

BACKGROUND ART

As one of noises generated in a pneumatic tire, there is cavity resonance sound which is generated due to the vibration of the air filled in the tire. When the tire is running on a road surface, the tread portion is vibrated due to the roughness of the road surface. The vibration of the tread portion causes the air in the tire to vibrate, so that the cavity resonance sound is generated. It is known that the frequency of the cavity resonance sound of a pneumatic tire is approximately 250 Hz.

Conventionally, as methods of reducing the cavity resonance sound in a pneumatic tire, the following ones have been proposed. In the methods, one or more noise absorbing members formed of a porous material are attached continuously or with intervals to the tire inner peripheral surface of a tread portion so that cavity resonance sound is absorbed by the noise absorbing members (for example, see Patent Documents 1 and 2).

In the case of the tire having noise absorbing members attached to the tire inner peripheral surface thereof as described above, when the tire comes to the end of life due to wear or the like, the noise absorbing members are discarded together with the tire having come to the end of life. However, there is another method of attaching noise absorbing members, that noise absorbing members are bonded to an elastic band in advance and then attached indirectly to the tire inner peripheral surface by using the elastic band. According to the method, even when the tire comes to the end of life, the noise absorbing members are removed together with the elastic band so as to be reused in another new tire. For this reason, this method is beneficial for resource conservation.

However, in a case where the noise absorbing members are indirectly attached with the elastic band, the noise absorbing members move relatively in the tire circumferential direction when the tire rotates. For this reason, when the tire runs over a nail on the road and then continues to run, the tip of the nail tears the noise absorbing members moving relative to the tire inner peripheral surface. This leads to a problem in which it is impossible to reuse the noise absorbing members.

Patent Document 1: Japanese patent application Kokai publication No. Sho62-216803
Patent Document 2: Japanese patent application Kokai publication No. 2003-252003

DISCLOSURE OF THE INVENTION

An object of the present invention is to provide a low noise pneumatic tire in which the damage of noise absorbing members disposed on the tire inner peripheral surface is suppressed to the minimum even when the tire runs over a nail.

In order to attain the above-described object, a low noise pneumatic tire according to the present invention comprises the following characteristics. The low noise pneumatic tire includes a single or a plurality of noise absorbing members formed of a porous material attached to one side of surfaces of an elastic band in the longitudinal direction thereof, and also disposed on the tire inner peripheral surface by using the elastic band along the circumferential direction. Furthermore, the low noise pneumatic tire includes a plurality of width-direction reinforcing members disposed with intervals in the tire circumferential direction on surfaces, facing the elastic band, of the corresponding noise absorbing members, and also extending from the elastic band to side ends of the corresponding noise absorbing members in the width direction thereof.

As described above, each of the plurality of width-direction reinforcing members is disposed with intervals in the tire circumferential direction on surfaces, facing the elastic band, of the noise absorbing members, and also extends from the elastic band to side ends of the noise absorbing members in the width direction thereof. Accordingly, even when the tire runs over a nail during running which sticks in the noise absorbing member, the relative movement of the nail to the noise absorbing member is restricted within a region between adjacent two of the width-direction reinforcing members. This makes it possible to prevent the noise absorbing member from being damaged. As a result, when the tire comes to the end of life, it is possible to reuse the noise absorbing member in another new tire.

In order to attain the above-described object, another low noise pneumatic tire according to the present invention comprises the following characteristics. The low noise pneumatic tire includes a single or a plurality of noise absorbing members formed of a porous material attached to one side of surfaces of an elastic band in the longitudinal direction thereof, and also disposed on the tire inner peripheral surface by using the elastic band along the circumferential direction. Further, the low noise pneumatic tire includes nonwoven fabric joined to surfaces, facing the elastic band, of the noise absorbing members.

As described above, the nonwoven fabric is joined to surfaces, facing the elastic band, of the noise absorbing members. Accordingly, even when the tire runs over a nail during running which sticks in the noise absorbing member, the relative movement of the nail to the noise absorbing member is restricted by the nonwoven fabric. This makes it possible to prevent the noise absorbing member from being damaged. As a result, when the tire comes to the end of life, it is possible to reuse the noise absorbing member in another new tire.

BEST MODES FOR CARRYING OUT THE INVENTION

Figure 1:
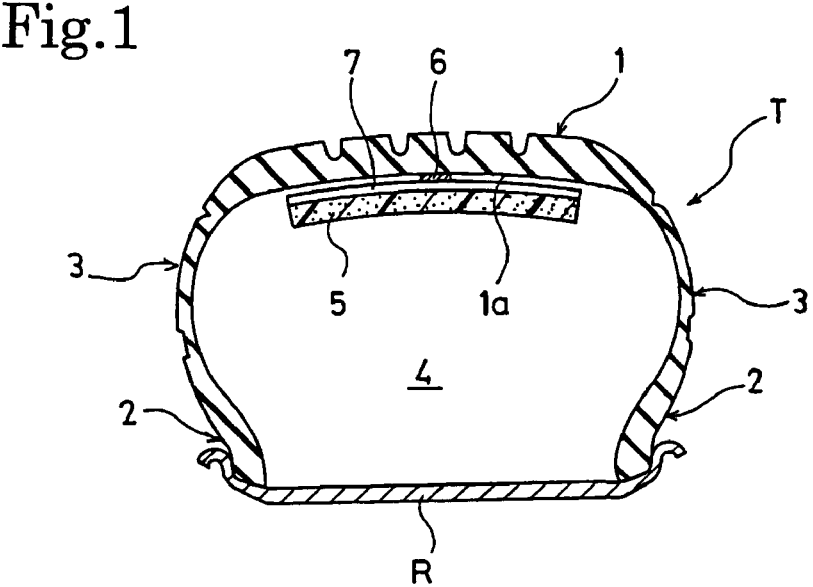
FIG. 1 is a cross-sectional view taken along the meridional direction, and showing an example of a low noise pneumatic tire of the present invention.
Figure 2:
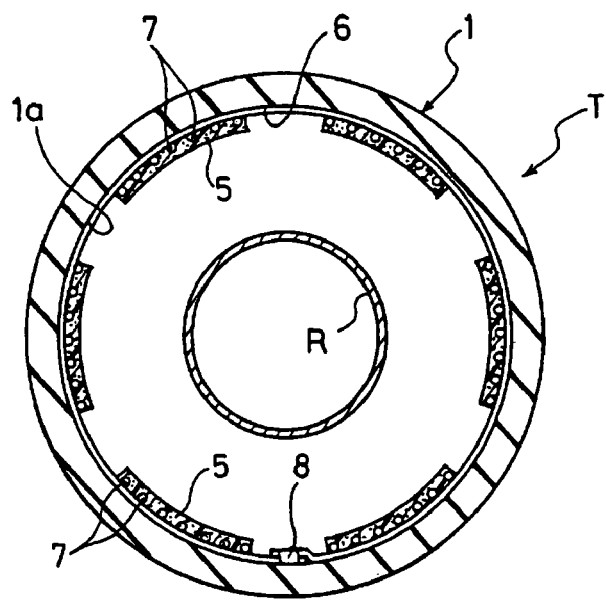
FIG. 2 is a cross-sectional view showing the tire shown in FIG. 1, which is taken along a plane perpendicular to the axis about which the tire rotates.

FIGS. 1 and 2 show a low noise pneumatic tire T being mounted on a rim R. A pair of right and left side wall portions 3, 3 as well as a pair of right and left bead portions 2, 2 are formed respectively on the right and left sides of a tread portion 1, while a cavity portion 4 is formed inside the low noise pneumatic tire T.

An elastic band 6 is attached to the tire inner peripheral surface 1a annularly in the tire circumferential direction on the inner side of the tread portion 1. A plurality of noise absorbing members 5 formed of a porous material are joined with intervals to the inner peripheral surface of the elastic band 6. The elastic band 6 is attached to the tire inner peripheral surface 1a while being annularly curved, and then the two end portions of the elastic band 6 are joined to each other with a clamp 8. In addition, a plurality of rod-shaped width-direction reinforcing members 7 are provided between the elastic band 6 and the noise absorbing members 5. Each of the plurality of width-direction reinforcing members 7 intersects the elastic band 6 to extend to both side ends of the noise absorbing member 5. The plurality of width-direction reinforcing members 7 are arranged with intervals in the tire circumferential direction, and are also bonded to both of the inner peripheral surface of the elastic band 6 and the surface of the noise absorbing members 5 respectively.

The width-direction reinforcing members 7 fixed to the elastic band 6 are disposed on the surface of the noise absorbing members 5 and extend from the elastic band 6 to both side ends of the noise absorbing member 5 in the width direction thereof, and also arranged with intervals in the tire circumferential direction. Accordingly, when the tire runs over a nail and the nail sticks in the noise absorbing member, the movement of the nail relative to the noise absorbing members is restricted within a region between adjacent two of the width-direction reinforcing members in the circumferential direction. This makes it possible to prevent the noise absorbing members from being damaged.

In the example shown in the figures, the noise absorbing members 5 are constituted of a plurality of independent pieces separated from one another. However, it is also possible to employ one formed to round on the tire inner peripheral surface 1a as a single band.

Figure 3:
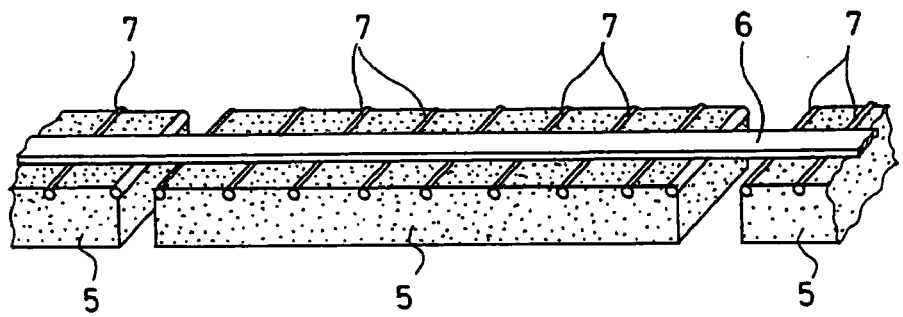
FIG. 3 is a perspective view showing a chief part of noise absorbing members of an embodiment used in the low noise pneumatic tire of the present invention.

FIG. 3 shows a perspective view of the noise absorbing members 5 from the side that the noise absorbing members 5 are joined to the elastic band 6, namely, from the side that the noise absorbing members 5 face the tire inner peripheral surface 1a. Between the elastic band 6 and the noise absorbing members 5, the plurality of rod-shaped width-direction reinforcing members 7 are attached with intervals in the longitudinal direction, as well as intersect the longitudinal direction of the elastic band 6. Moreover, the plurality of noise absorbing members 5 constituted of independent pieces having the width-direction reinforcing members 7 disposed on the surface thereof are attached to be joined with intervals in the longitudinal direction of the elastic band 6. The joint between the noise absorbing members 5 and the elastic band 6 may be fixed with an adhesive agent, or may be fixed by means of ultrasonic welding. The joint between the elastic band 6 and the width-direction reinforcing members 7, and the joint between the width-direction reinforcing members 7 and the noise absorbing members 5 may be also fixed in the same manner.

Figure 4:
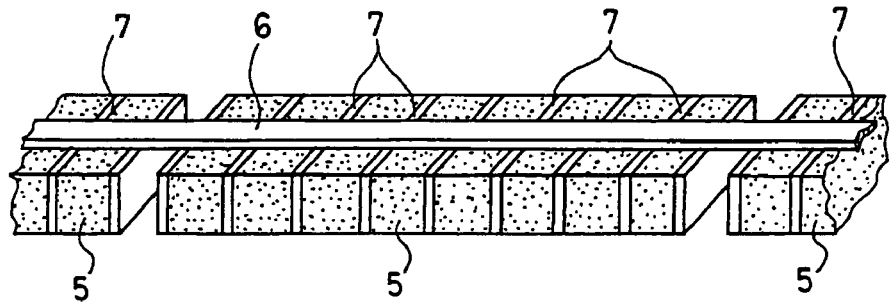
FIG. 4 is a perspective view showing a chief part of noise absorbing members of another embodiment used in the low noise pneumatic tire of the present invention.

Each of the width-direction reinforcing members 7 may be formed into a plate shape as shown in FIG. 4 instead of the above-described rod shape. Each of the noise absorbing members 5 shown in FIG. 4 is formed of small noise absorbing members 5a divided as a block shape and width-direction reinforcing members 7 shaped as a plate. The small noise absorbing members 5a and the width-direction reinforcing members 7 are alternately attached one by one to be formed into a laminate. In each of the noise absorbing members 5, the plate surfaces of the width-direction reinforcing members 7 extend in both of the width direction and the thickness direction of the noise absorbing member 5. For this reason, when a nail sticks in the noise absorbing member 5, the relative movement of the nail can be restricted more effectively than otherwise.

Figure 5:
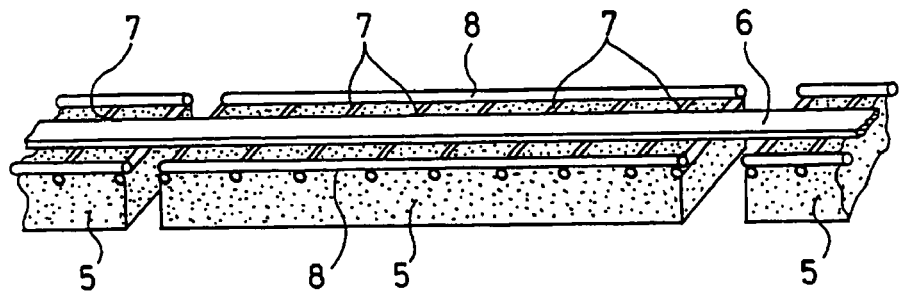
FIG. 5 is a perspective view showing a chief part of noise absorbing members of still another embodiment used in the low noise pneumatic tire of the present invention.
Figure 6:
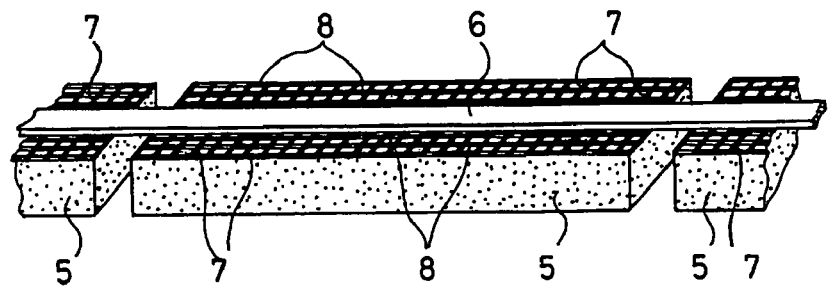
FIG. 6 is a perspective view showing a chief part of noise absorbing members of yet another embodiment used in the low noise pneumatic tire of the present invention.

In the case that the width-direction reinforcing members 7 are rod-shaped, a plurality of rod-shaped circumferential-direction reinforcing members 8 may be connected to intersect the width-direction reinforcing members 7 disposed with intervals in the tire circumferential direction, as shown in FIG. 5. In the case shown in FIG. 5, the circumferential-direction reinforcing members 8 are provided respectively to both ends of the width-direction reinforcing members 7. However, as shown in FIG. 6, a plurality of rod-shaped circumferential-direction reinforcing members 8 may be joined to a plurality of the width-direction reinforcing members 7 so as to form a grid. It is preferable the width-direction reinforcing members 7 and the circumferential-direction reinforcing members 8 are formed of the same material, but may also be formed of different materials from each other. As is clear from the embodiments shown respectively in FIGS. 5 and 6, the addition of the circumferential-direction reinforcing members 8 reinforces the rigidity of the width-direction reinforcing members 7. Accordingly, when a nail sticks in the noise absorbing member 5, the relative movement of the nail can be restricted more effectively than otherwise.

Figure 7:
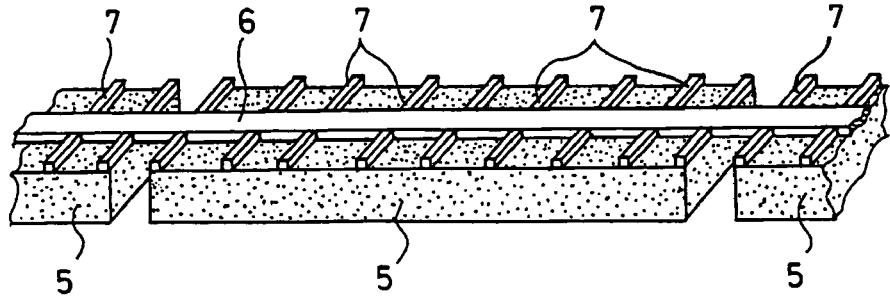
FIG. 7 is a perspective view showing a chief part of noise absorbing members of still yet another embodiment used in the low noise pneumatic tire of the present invention.

In the case of the rod-shaped width-direction reinforcing members, the rod-shaped width-direction reinforcing members 7 may be connected to both side walls of the elastic band 6 as shown in FIG. 7, instead of being joined to one side surface of the elastic band 6, so as to intersect each other as in the above-described embodiments. In this case, the width-direction reinforcing members 7 may be connected to the elastic band 6 by molding integrally when the elastic band 6 is molded from a resin. Alternatively, the width-direction reinforcing members 7 and the elastic band 6 each molded independently may be melt-bonded or may be bonded with an adhesive agent. When the width-direction reinforcing members 7 are connected to the side walls of the elastic band 6, the joint area between the elastic band 6 and the noise absorbing members 5 is made larger. Accordingly, the fixation of the noise absorbing members 5 to the elastic band 6 can be further reinforced.

Figure 8:
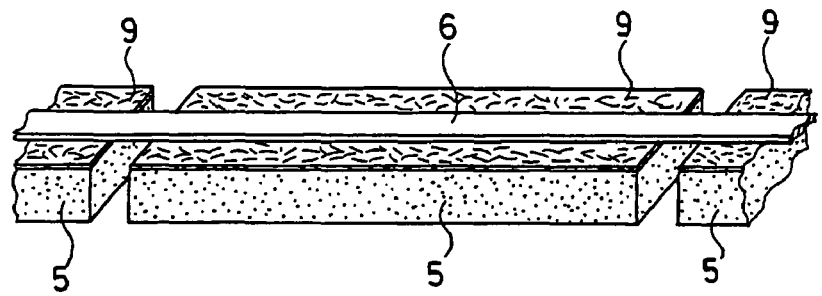
FIG. 8 is a perspective view showing a chief part of noise absorbing members of further still another embodiment used in the low noise pneumatic tire of the present invention.

As means for protecting the noise absorbing members when the tire runs over a nail, nonwoven fabric 9 formed of a plurality of fibers entangled with one another as shown in FIG. 8, instead of the above-described width-direction reinforcing members. The nonwoven fabric 9 is placed between the elastic band 6 and the noise absorbing member 5 to cover the entire surface of the noise absorbing member 5 and connected to both of the elastic band 6 and the noise absorbing member 5. As the connecting means, a bonding by an adhesive agent or a welding by the ultrasonic treatment may be applied. Since the nonwoven fabric is joined to cover the surface, facing the elastic band, of the noise absorbing member as described above, even when the nail sticks in the noise absorbing member during the tire running, the nonwoven fabric prevents the relative movement of the nail to the noise absorbing member. As a result, the noise absorbing member is prevented from being damaged.

Figure 9:
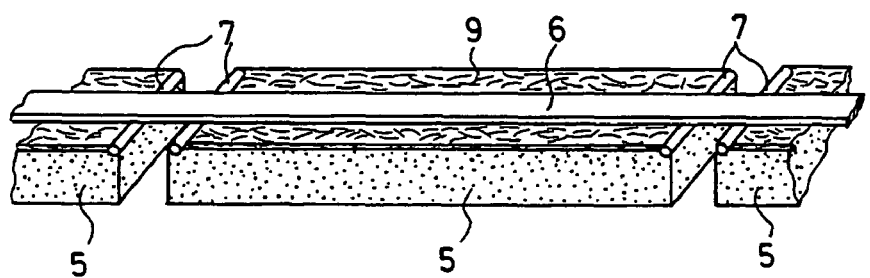
FIG. 9 is a perspective view showing a chief part of noise absorbing members of further yet another embodiment used in the low noise pneumatic tire of the present invention.
Figure 10:
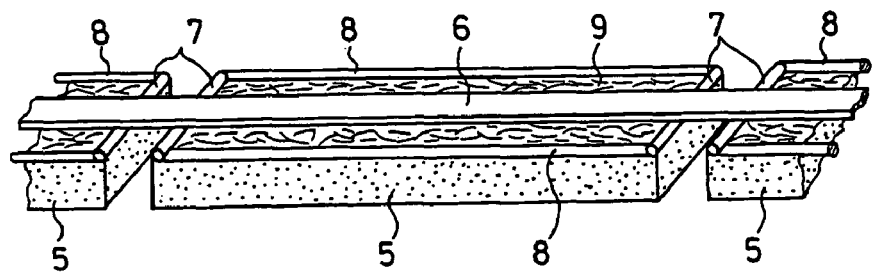
FIG. 10 is a perspective view showing a chief part of noise absorbing members of further still yet another embodiment used in the low noise pneumatic tire of the present invention.

In the case of using the nonwoven fabric as means for protecting the noise absorbing member, the width-direction reinforcing members 7 may be provided to the front and back ends of the nonwoven fabric 9 in the circumferential direction, as shown in FIG. 9. In addition to that, the circumferential-direction reinforcing members 8 may be further provided to the both side ends of the nonwoven fabric 9 in the width direction, as shown in FIG. 10.

In the present invention, the noise absorbing members are formed of a porous material. As the porous material, a foamed resin having open cells is preferable. More preferably, a foamed urethane resin may be used. Among foamed urethane resins, polyether urethane foam is preferable since the polyether urethane foam has an excellent pressure resistance, and accordingly is unlikely to be compressed and deformed by the tire internal pressure.

As the disposition structure of the noise absorbing members, the noise absorbing member may be disposed continuously on the tire inner peripheral surface as a single band form. However, it is preferable that the plurality of noise absorbing members separated from one another are disposed with intervals in the tire circumferential direction. The disposition of the noise absorbing members separated from one another with intervals in the tire circumferential direction eases the flexural deformation of the noise absorbing members due to the deformation of the portion of the tire contacting the ground. As a result, it is possible to improve the durability of the noise absorbing members as compared with the case of continuously disposing the noise absorbing member.

In the case where the noise absorbing members of the plurality of independent pieces separated from one another are disposed, the noise absorbing members are preferably disposed in the following manner. The number of the noise absorbing members is preferably from 5 to 50. The distance between adjacent two of the noise absorbing members is preferably not less than the maximum thickness of the noise absorbing member at the end portions thereof. The total length obtained by integrating the lengths of the noise absorbing members in the tire circumferential direction is preferably not less than 75% of the tire maximum inner peripheral length. When the distance between each adjacent two of the noise absorbing members is not less than the maximum thickness of the noise absorbing member at the end portions thereof, it is possible to eliminate the case where the adjacent two noise absorbing members interfere with each other, thus preventing the noise absorbing members from being damaged. In addition, when the total length obtained by integrating the lengths of the noise absorbing members in the tire circumferential direction is not less than 75% of the tire maximum inner peripheral length, the absorption of cavity resonance sound can be secured. Moreover, when the number of the noise absorbing members is from 5 to 50, it is possible to balance the weight in the tire circumferential direction, thus suppressing the tire vibration.

In the present invention, the "tire maximum inner peripheral length" represents the inner peripheral length on the equator line in the inner peripheral surface of the pneumatic tire in a state where the pneumatic tire is mounted on a rim specified by JATMA, and is then inflated to the standard internal pressure.

The elastic band, the width-direction reinforcing members, and the circumferential-direction reinforcing members are preferably made of a resin. As the resin, polypropylene, polyethylene, polyethylene terephthalate or nylon is preferable. The distance between each adjacent two of the width-direction reinforcing members in the tire circumferential direction is preferably not less than 10 mm while being one quarter of the circumferential length of each of the noise absorbing members separated from one another as independent pieces, or is more preferably not more than 100 mm. The disposition of the width-direction reinforcing members at the above-described distances in the tire circumferential direction makes it possible to effectively prevent the noise absorbing members from being damaged when the tire runs over a nail.

In the case where the width-direction reinforcing members and the circumferential-direction reinforcing member have a rod shape each, the thickness of each of those members is preferably from 0.5 mm to 2.0 mm. Here, in a case where the cross-section of the rod is a circle, the "thickness" means the diameter of the rod. In a case where the cross-section of the rod is a polygon other than a circle, the "thickness" means the diameter of the inscribed circle of the polygon. In a case where each of the width-direction reinforcing members is a plate, the thickness of the plate is preferably from 0.5 mm to 2.0 mm.

In a case where the means for protecting the noise absorbing members is the nonwoven fabric as shown in FIGS. 8 to 10, it is preferable that the nonwoven fabric covers the entire surface of the corresponding noise absorbing member in the width and circumferential directions. However, it is necessary that, in the width direction, the nonwoven fabric is disposed to cover the entire width of the corresponding noise absorbing member 5, but in the tire circumferential direction, the nonwoven fabric 9 may be disposed with intervals.

The nonwoven fabric is a sheet made of a plurality of fibers entangled randomly with one another. As examples of a material of the fiber, given are resins including polypropylene, polyethylene, polyethylene terephthalate, nylon and so on. The thickness of the nonwoven fabric is preferably from 1 mm to 10 mm.

As to the elastic band having the noise absorbing members attached to one side of surfaces thereof as described above, the noise absorbing members may be disposed on the outer peripheral surface of the elastic band. In this case, when the elastic band is attached to the tire inner peripheral surface, the noise absorbing members are sandwiched between the tire inner peripheral surface and the elastic band. However, it is preferable that the elastic band be attached to the tire inner peripheral surface with pressure, and that the noise absorbing members be then placed on the inner peripheral side of the elastic band as in the embodiments shown in the figures. According to such an attachment method, the entire surfaces of the noise absorbing members are not clogged with the elastic band. As a result, it is possible to improve the performance of the noise absorbing members in absorbing the cavity resonance sound.

EXAMPLE

Prepared were pneumatic tires of Example and Comparative Example, having the same tire size of 215/55R16 95H. In each pneumatic tire, 9 noise absorbing members formed of urethane foam, each having a width of 150 mm, a length of 180 mm and a thickness of 20 mm, were bonded to an elastic band formed of polypropylene at distances of approximately 30 mm. At this time, in the pneumatic tire of Example, a reinforcing member was interposed between the noise absorbing members and the elastic band. The reinforcing member was formed by disposing polypropylene rods each having a diameter of 10 mm into a grid of 20 mm by 20 mm, as shown in FIG. 6. In the pneumatic tire of Comparative Example, the reinforcing member was not interposed.

A nail having a diameter of 30 mm was stuck in the tread portion of each of these two kinds of pneumatic tires so as to penetrate to the noise absorbing member. Then, each pneumatic tire was inflated to an air pressure of 150 kPa, and was then rotated at a speed of 80 km/h by using a drum testing machine. The running distance of each pneumatic tire until the corresponding noise absorbing member was dropped out was measured as the durability of the noise absorbing member. The measurement results are indicated by indices where the running distance of the tire of Comparative Example is taken as 100. The larger the index is, the more excellent the durability is.

TABLE 1

| | Comparative Example | Example |
|---|---|---|
| Durability of Noise Absorbing Members | 100 | 347 |

As is clear from the results shown in Table 1, the tire of Example is more excellent in the durability of the noise absorbing members than the tire of Comparative Example.

What is claimed is:

1. A low noise pneumatic tire comprising:
a single or a plurality of noise absorbing members formed of a porous material attached to one side of surfaces of an elastic band in the longitudinal direction thereof, and disposed on the tire inner peripheral surface by using the elastic band along the circumferential direction, and
a plurality of width-direction reinforcing members made from resin and disposed with intervals in the tire circumferential direction on surfaces, facing the elastic band, of the corresponding noise absorbing members, and extending from the elastic band to side ends of the corresponding noise absorbing members in the width direction thereof,
wherein said single or plurality of noise absorbing members are made of a different material than said plurality of width-direction reinforcing members.

2. The low noise pneumatic tire according to claim 1, wherein the distance between each adjacent two of the width-direction reinforcing members disposed in the tire circumferential direction is not less than 10 mm, and is also not more than one quarter of the length of each noise absorbing member in the tire circumferential direction.

3. The low noise pneumatic tire according to claim 1, wherein each of the width-direction reinforcing members has a rod shape.

4. The low noise pneumatic tire according to claim 1, wherein
the number of the noise absorbing members is from 5 to 50, and
the total length obtained by integrating the lengths of the noise absorbing members in the tire circumferential direction is not less than 75% of the tire maximum inner peripheral length.

5. A low noise pneumatic tire comprising:
a single or a plurality of noise absorbing members formed of a porous material attached to one side of surface of an elastic band in the longitudinal direction thereof, and disposed on the tire inner peripheral surface by using the elastic band along the circumferential direction, and nonwoven fabric joined to surfaces, facing the elastic band, of the noise absorbing members.

6. The low noise pneumatic tire according to claim 5, wherein the thickness of the nonwoven fabric is from 1 mm to 10 mm.

7. The low noise pneumatic tire according to claim 5, wherein
the elastic band is annularly disposed on the tire inner peripheral surface so as to be attached thereto with pressure, and
the noise absorbing members are disposed on the inner peripheral side of the elastic band.

8. The low noise pneumatic tire according to claim 5, wherein
the number of the noise absorbing members is from 5 to 50, and
the total length obtained by integrating the lengths of the noise absorbing members in the tire circumferential direction is not less than 75% of the tire maximum inner peripheral length.

9. A low noise pneumatic tire comprising:
a single or a plurality of noise absorbing members formed of a porous material attached to one side of surfaces of an elastic band in the longitudinal direction thereof, and disposed on the tire inner peripheral surface by using the elastic band along the circumferential direction; and
a plurality of width-direction reinforcing members disposed with intervals in the tire circumferential direction on surfaces, facing the elastic band, of the corresponding noise absorbing members, and extending from the elastic band to side ends of the corresponding noise absorbing members in the width direction thereof, wherein each of the width-direction reinforcing members has a rod shape,
wherein a plurality of circumferential-direction reinforcing members having a rod shape are joined to intersect the width-direction reinforcing members.

10. The low noise pneumatic tire according to any one of claims 3 and 9, wherein the thickness of each of the width-direction reinforcing members and the circumferential-direction reinforcing members is from 0.5 mm to 2.0 mm.

11. A low noise pneumatic tire comprising:
a single or a plurality of noise absorbing members formed of a porous material attached to one side of surfaces of an elastic band in the longitudinal direction thereof, and disposed on the tire inner peripheral surface by using the elastic band along the circumferential direction, and
a plurality of width-direction reinforcing members disposed with intervals in the tire circumferential direction on surfaces, facing the elastic band, of the corresponding noise absorbing members, and extending from the elastic band to side ends of the corresponding noise absorbing members in the width direction thereof,
wherein each of the width-direction reinforcing members has a plate shape, which is inserted to cross the noise absorbing members in the thickness and width directions of the noise absorbing members.

12. The low noise pneumatic tire according to claim 11, wherein the thickness of each of the width-direction reinforcing members is from 0.5 mm to 2.0 mm.

13. A low noise pneumatic tire comprising:

a single or a plurality of noise absorbing members formed of a porous material attached to one side of surfaces of an elastic band in the longitudinal direction thereof, and disposed on the tire inner peripheral surface by using the elastic band along the circumferential direction, and a plurality of width-direction reinforcing members disposed with intervals in the tire circumferential direction on surfaces, facing the elastic band, of the corresponding noise absorbing members, and extending from the elastic band to side ends of the corresponding noise absorbing members in the width direction thereof, wherein the elastic band is annularly disposed on the tire inner peripheral surface so as to be attached thereto with pressure, and wherein the noise absorbing members are disposed on the inner peripheral side of the elastic band.

* * * * *